ent Office 3,422,038
Patented Jan. 14, 1969

3,422,038
SYNTHETIC LATEX FOAM COMPOSITION AND METHOD OF MAKING SAME
Victor E. Meyer, Midland, Clarence J. Tacey, Sanford, and Dennis E. Houggy, Midland, Mich., assignors to The Dow Chemical Company, Midland, Mich., a corporation of Delaware
No Drawing. Filed July 21, 1966, Ser. No. 566,752
U.S. Cl. 260—2.5   7 Claims
Int. Cl. C08g 53/08; C08g 37/32

ABSTRACT OF THE DISCLOSURE

A latex foam composition comprising a latex of (1) a copolymer of a styrene compound, an aliphatic conjugated diene, and an $\alpha,\beta$-ethylenically unsaturated carboxylic acid and (2) a water dispersible melamine-formaldehyde resin, the improvement of including in the blend from 0.5 part to 2.0 parts by weight of a water-soluble sulfite. The invention also encompasses the process of making the latex foam composition.

---

This invention relates to synthetic latex foam. Especially, it relates to improved latex foam compositions and to a method for preparing synthetic latex foam products.

It has been known to use synthetic latexes in the preparation of foam rubber since about the time of World War II, first in blends with natural rubber latex and later as the sole latex component. More recently, there has been described in United States Letters Patent No. 3,215,647 new synthetic latex foams which are prepared from latexes (sometimes called reactive latexes) of copolymers having reactive groups and from added water-dispersible compositions which are coreactive therewith. In the preparation of such latex foam products, blends are prepared which necessarily consist of the latex and the coreactive material and which often also contain other components such as foam stabilizers, pH control agents, foaming aids, thickeners, mineral fillers, antioxidants and may contain other materials such as plasticizers and other formulating agents. The resulting aqueous composition is foamed or frothed by one of various known methods such as by blowing agents or by whipping or by use of apparatus having commercially available foam heads.

Early effects of the interaction between the latex component and the coreactive material (sometimes called gelling or gelation because of the paucity of short, exact descriptive language) assist in holding the frothed composition in its cellular form until further drying and curing, usually by the application of heat, result in the desired foam product. The blend of latex, coreactive material and any added formulating ingredients which is ready for the foaming step is often called, for convenience, the foam "formulation." The composition, after the foaming or frothing step but before noticeable drying and curing has taken place, often is called "wet froth." The wet froth must have the property of maintaining its cellular structure but yet must not be unduly viscous especially when the wet froth is to be forced through a hose and/or coated with doctoring equipment to obtain a predetermined thickness of foam. In processes using doctoring equipment, unduly high wet froth viscosity results in the formation of large air bubbles in the bank of froth behind the doctor bar. These bubbles become entrapped in the wet froth and lower the quality of the finished foam. Additionally, it is highly advantageous to use a foam formulation having a high percentage of solids in order to minimize the amount of water which must be removed from the wet froth from drying. Consequently, it is highly desirable to have a means for control or adjustment of the wet froth viscosity without unduly reducing the froth stability, and without reducing the percent solids of the formulation or of the wet froth composition. To facilitate pumping, or other handling of the foam formulation, it is also desirable to have a means of reducing the formulation viscosity without causing significant loss of stability in the subsequently formed wet froth.

In the preparation of latex foam structures especially when applying a layer of foam to a backing material, such as in foam-backed textiles, it is desirable to obtain a predetermined thickness of finished foam. It is common practice to use some sort of doctoring equipment to establish the desired thickness of the wet froth, then subsequently carry out the curing and drying steps. It is highly advantageous to have a system wherein the thickness of the final cured foam does not differ greatly from the thickness of the doctored, wet froth layer—this characteristic is often called "gauge retention." Related to gauge retention is the retention of the cellular structure.

It has been discovered, and such discovery is the subject of the present invention, that the method of preparation of latex foam products by the steps comprising:

(1) Blending a latex of a copolymer of (a) a styrene compound, (b) an aliphatic conjugated diene having from 4 to 10 carbon atoms, and (c) an ethylenically unsaturated carboxylic acid with a water-dispersible melamine-formaldehyde resin;
(2) Foaming the resulting blend to form a wet froth;
(3) Drying and curing the resulting froth;

is improved by the addition of from about 0.5 part to about 2.0 parts by weight of a water-soluble sulfite such as sodium sulfite, potassium sulfite or ammonium sulfite, per 100 parts of latex solids. The improvement consisting of the addition of a water-soluble sulfite of the kind described in the amounts shown to a blend comprising a reactive latex and a coreactive material provides means for adjusting the formulation viscosity and the wet froth viscosity while reducing or eliminating undesirable odors without loss in the guage retention.

The latexes operable in the practice of this invention are prepared from known monomers by known procedures. These known monomers consist of at least three different kinds:

(1) A styrene compound;
(2) An aliphatic conjugated diene, and
(3) An $\alpha,\beta$-ethylenically unsaturated carboxylic acid or monomer hydrolyzable to such carboxylic acid.

By the term "styrene compound" is meant styrene per se and substituted styrenes, especially alkyl-substituted styrenes. Generally, the alkyl substituent is a lower alkyl group, i.e., an alkyl having from 1 to 4 carbon atoms. Representative styrene compounds are styrene, alpha-methylstyrene, p-vinyltoluene, o-vinyltoluene, p-tert-butylstyrene, ar-ethylstyrene, ar-dimethylstyrene and the like.

The aliphatic conjugated diene monomers have from 4 to 10 carbon atoms and are represented by isoprene and especially 1,3-butadiene.

The carboxylic acid monomers consist of the $\alpha,\beta$-ethylenically unsaturated acids and compounds convertible to such monomers. Representative examples are monocarboxylic acids such as acrylic acid, methacrylic acid, and ethacrylic acid; dicarboxylic acids such as maleic acid, fumaric acid, and itaconic acid; mono esters of dicarboxylic acids such as maleic half esters, fumaric half esters, itaconic half esters, and mixtures of any of the above. The monomers hydrolyzable to $\alpha,\beta$-ethylenically unsaturated carboxylic acids include maleic anhydride, esters and amides of the above named carboxylic acids especially such esters and amides of the monocarboxylic acids and also the corresponding nitriles such as acrylonitrile, methacrylonitrile, and the like.

The latexes are prepared by conventional methods from the prescribed classes of monomers, preferably by emulsion polymerization. However, solution polymerization or other polymerization methods may be used with subsequent conversion of the products by known procedures to latex form. The class of monomers which are convertible to carboxylic acids ordinarily is copolymerized with one or more of each of the other required classes of monomers, then the conversion step (such as by hydrolysis) is carried out. Alternative to the direct copolymerization of at least one monomer from each of the three classes of monomers, a copolymer may be prepared from the styrene compound and the alphatic conjugated diene and onto such preformed polymer there may be polymerized by known graft polymerization methods the ethylenically unsaturated carboxylic acid or equivalent.

The melamine-formaldehyde resins which are useful in the practice of this invention are the adducts of formaldehyde and melamine of sufficiently low molecular weight to be water-dispersible and the lower alkyl ethers, especially the methyl ether, of the above described melamine-formaldehyde adducts. The etherified (or alkylated) melamine-formaldehyde adducts may be partially or fully etherified, i.e., the hydroxymethyl substituent of the adducts may be partially or substantially fully converted to lower alkyl ether groups. Also mixtures of melamine-formaldehyde adducts having varying degrees of etherification may be mixed with each other or with melamine-formaldehyde adducts having no ether substituents. The term "melamine-formaldehyde resin" is intended to include materials of the above description. Descriptions and methods of preparation of materials of this type are included in the chapter VIII, "Condensations with Formaldehyde," in Schildknecht, Polymer Processes, vol. X, of High Polymer Series, Interscience Publishers Inc., New York, pages 295–350. In the practice of this invention, the improvement described does not preclude the inclusion of other materials coreactive with the latex provided at least some of the melamine-formaldehyde resin is included.

In the practice of this invention, the preparation of latex foam products typically follows the general procedure disclosed in United States Patent No. 3,215,647. The foam formulations necessarily contain the latex as described herein and the melamine-formaldehyde resin. Often such formulations also include other added components such as foam stabilizers, pH controlling agents, foaming aids, thickeners, antioxidants and conventional inorganic fillers, for example, clay, whiting, talc, mica, lithophone, and the like, although such are not required. The improvement provided by the present invention, i.e., the addition of the water-soluble sulfite of the type described, may be accomplished at various times and points within the overall process. For example, the sulfite may be mixed with the reactive latex before or after preparation of the blend of latex and coreactive material (melamine-formaldehyde resin) or any subsequent time up to completion of the frothing step. The preferred amount of water-soluble sulfite to obtain all the advantages of the invention is from about 1.0 to about 1.5 parts by weight per 100 parts by weight of latex solids in the composition. Some of the advantages are obtained, however within the ranges of 0.5 part to 1.0 part and from 1.5 to 2.0 parts, thus the overall operable range is from about 0.5 part to about 2.0 parts.

The wet froth suitably is coated onto a substrate to which it will adhere or releasably onto a surface which has been treated, such as with polytetrafluoroethylene, for example a thus treated belt or other similarly treated substrate. Alternatively, the wet froth may be placed in molds or spread on a flat tray. Curing and drying is accomplished in the conventional manner, usually by the application of heat.

The following examples illustrate how the invention may be practiced but are not to be construed as limiting its scope. In the examples, all parts and percentages are by weight unless otherwise specified.

Examples 1–12

For each of Examples 1–12, inclusive, and for comparative materials $C_1$, $C_2$, and $C_3$, a foam formulation was prepared by blending the following ingredients and adjusting with ammonium hydroxide the pH of the resulting blend to about 9.5:

| Ingredient | Dry basis (parts) | Wet basis (parts) |
|---|---|---|
| Latex [1] | 100 | 174 |
| Melamine-formaldehyde resin [2] | 7.5 | 11.3 |
| Sodium lauryl sulfate | 2.0 | 6.7 |
| Filler [3] | 100 | 100 |
| Silicone fluid, 100 centistoke | 1.0 | 1.0 |
| Methyl cellulose, 4,000 cps. grade | 0.25 | 10.0 |
| Water-soluble sulfite | As shown in Table I | |

[1] An aqueous dispersion of a copolymer of 42 parts of styrene, 56 parts of butadiene, 1.75 parts of acrylic acid and 0.25 part of fumaric acid.
[2] A water-soluble mixture of partially methylated, low-molecular weight melamine-formaldehyde adducts having an average of about 0.8 mole of methylol groups and about 1.8 moles of methoxymethyl groups for each mole of melamine.
[3] Finely ground calcium carbonate such that 99.5 percent passes through a 325-mesh screen.

For comparative material $C_4$ (not an example of this invention) the same steps and the same ingredients were used except that no water-soluble sulfite was added.

Small samples of the resulting foam formulations were removed for measurement of the viscosity with a coaxial cylinder viscometer. The formulation viscosity results are shown in Table I. The remaining quantities of the foam formulations were whipped in a Hobart mixer, model N-50, to a wet froth density of about 12 pounds per cubic foot. Small samples of the resulting wet froth were removed for determination of the wet froth viscosity, which also is shown in Table I. The remaining quantities of the wet froth for each example were doctored on a cheesecloth backing. For each sample, the thickness of the wet froth layer was measured, then one portion was placed immediately in a forced-air oven at 160° C. for 30 minutes. Another portion of the doctored wet froth was allowed to stand for 7 minutes, after which time the thickness was measured and that portion, immediately thereafter, was heated in the same manner and under the same conditions as the unaged portion. The results are shown in Table II.

TABLE I

| Example No. | Water-soluble sulfite | | Apparent viscosity (poise) [1] | | | | | |
|---|---|---|---|---|---|---|---|---|
| | | | At 19.6 sec.$^{-1}$ | | At 29.4 sec.$^{-1}$ | | At 58.8 sec.$^{-1}$ | |
| | Kind | Parts | Formulation | Wet froth | Formulation | Wet froth | Formulation | Wet froth |
| 1 | Sodium Sulfite | 0.5 | 12.0 | 38.5 | 9.6 | 28.9 | 6.9 | 17.6 |
| 2 | do | 1.0 | 12.8 | 38.5 | 10.1 | 18.2 | 6.7 | 16.8 |
| 3 | do | 1.5 | 9.6 | 41.5 | 7.5 | 31.0 | 5.3 | 19.2 |
| 4 | do | 2.0 | 7.2 | 32.1 | 5.9 | 26.2 | 4.3 | 15.8 |
| C$_1$ [2] | do | 3.0 | 4.0 | 24.1 | 3.7 | 19.2 | 2.7 | 11.8 |
| 5 | Potassium Sulfite | 0.5 | 15.2 | 24.9 | 12.3 | 15.0 | 8.0 | 8.0 |
| 6 | do | 1.0 | 16.0 | 47.3 | 13.4 | 33.7 | 8.6 | 17.6 |
| 7 | do | 1.5 | 20.0 | 47.3 | 15.0 | 35.3 | 10.4 | 21.1 |
| 8 | do | 2.0 | 16.8 | 40.1 | 12.8 | 26.7 | 8.3 | 13.4 |
| C$_2$ [2] | do | 3.0 | 8.0 | 33.7 | 6.4 | 24.7 | 4.5 | 15.0 |
| 9 | Ammonium sulfite | 0.5 | 11.2 | 36.9 | 8.6 | 26.7 | 9.1 | 16.6 |
| 10 | do | 1.0 | 11.2 | 36.1 | 9.1 | 26.7 | 6.1 | 16.0 |
| 11 | do | 1.5 | 8.0 | 31.2 | 6.9 | 24.0 | 4.8 | 15.0 |
| 12 | do | 2.0 | 4.8 | 25.7 | 4.8 | 20.3 | 3.4 | 12.8 |
| C$_3$ [2] | do | 3.0 | 4.8 | 24.0 | 3.7 | 19.2 | 2.7 | 12.5 |
| C$_4$ [2] | None | 0.0 | 18.4 | 38.5 | 13.9 | 28.9 | 9.1 | 17.6 |

[1] The apparent viscosity (poise) is defined as the total shear stress (dynes/cm.$^2$) divided by the shear rate (sec.$^{-1}$).
[2] Not examples of this invention.

TABLE II.—THICKNESS RETENTION [1]

| Example No. | Wet Froth | | Cured Foam | |
|---|---|---|---|---|
| | Initial | Aged [2] | Unaged | Aged |
| 1 | 36 | 36 | 41 | 38 |
| 2 | 36 | 35 | 40 | 37 |
| 3 | 36 | 36 | 39 | 32 |
| 4 | 36 | 35 | 34 | 25 |
| C$_1$ [3] | 36 | 37 | 29 | 23 |
| 5 | 37 | 35 | 38 | 28 |
| 6 | 37 | 36 | 40 | 39 |
| 7 | 39 | 38 | 36 | 32 |
| 8 | 36 | 38 | 38 | 35 |
| C$_2$ [3] | 36 | 32 | 29 | 10 |
| 9 | 38 | 39 | 33 | 30 |
| 10 | 40 | 39 | 34 | 35 |
| 11 | 40 | 40 | 35 | 29 |
| 12 | 36 | 35 | 36 | 31 |
| C$_3$ [3] | 39 | 37 | 23 | 15 |
| C$_4$ [3] | 36 | 35 | 38 | 32 |

[1] Measurements are in 64th of an inch.
[2] After 7 minutes.
[3] Not examples of this invention.

EXAMPLES 13–21

Additional foam samples were prepared by the procedure and with the ingredients described for Examples 1–12, except the wet froth was heated in the oven for 40 minutes, i.e., until the temperature in the interior of the foam was 160° C. After the cloth backing was removed, a portion weighing 1.00 gram was cut from each cured sample and was shaken overnight in 100 milliliters of distilled water. The formaldehyde content of the resulting aqueous phase was obtained by a polarographic determination. The results are shown in Table III.

TABLE III

| Example No. | Water-soluble sulfite | | Aqueous phase, formaldehyde content, p.p.m. |
|---|---|---|---|
| | Kind | Amount | |
| 13 | Sodium sulfite | 0.5 | 14.7 |
| 14 | do | 1.0 | 11.7 |
| 15 | do | 1.5 | 9.2 |
| 16 | Potassium sulfite | 0.5 | 7.2 |
| 17 | do | 1.0 | 7.6 |
| 18 | do | 1.5 | 7.1 |
| 19 | Ammonium sulfite | 0.5 | 1 |
| 20 | do | 1.0 | 1 |
| 21 | do | 1.5 | 1 |
| C$_5$ [1] | None | 0.0 | 15.0 |

[1] Not examples of this invention.

From the data shown in Table III it is apparent that the addition of water soluble sulfites of the kind claimed is effective in reducing the formaldehyde content of the cured foam. Direct odor comparisons, by smelling, confirmed that the sulfite addition had improved the odor characteristics of the foam samples except for the ammonium sulfite. With ammonium sulfite samples, the formaldehyde odor was essentially absent, however some other unidentified odor was present. Hence, sodium sulfite and potassium sulfite are preferred.

For comparison with the foregoing examples of the invention (Nos. 1–21) other samples were made by the same procedure as described in Examples 1–12 except that for the water soluble sulfite there was substituted sodium bisulfite in the amounts of 0.5 part, 1.0 part and 1.5 parts per 100 parts of latex solids. In each case objectionable yellowing occurred and unidentified new obnoxious odors were evident.

That which is claimed is:

1. In a latex foam composition comprising a blend of (1) a latex of a copolymer of a styrene compound, an aliphatic conjugated diene having from four to 10 carbon atoms and a α,β-ethylenically unsaturated carboxylic acid and (2) a water dispersible melamine-formaldehyde resin, the improvement of including in the blend from 0.5 part to 2.0 parts by weight of a water-soluble sulfite per 100 parts of latex solids in the blend, said water-soluble sulfite being selected from the group consisting of sodium sulfite, potassium sulfite, ammonium sulfite and mixtures thereof.

2. The improvement of claim 1 in which the blend also contains a filler.

3. The improvement of claim 1 in which the water-soluble sulfite is sodium sulfite.

4. The improvement of claim 1 in which the amount of the water-soluble sulfite is from about 1.0 part to about 1.5 parts by weight for each 100 parts of latex solids in the blend.

5. In a method for the preparation of latex foam products comprising the steps of
   (1) blending a latex of a copolymer of a styrene compound, an aliphatic conjugated diene having from four to 10 carbon atoms and an ethylenically unsaturated carboxylic acid with a water-dispersible melamine-formaldehyde resin
   (2) foaming the resulting blend to form a wet froth,
   (3) drying and curing the wet froth to provide a cellular product, the improvement of adding from about 0.5 part to about 2.0 parts by weight of a water-soluble sulfite per 100 parts of latex solids, said water-soluble sulfite being selected from the group consisting of sodium sulfite, potassium, sulfite, ammonium sulfite and mixtures thereof.

6. The improvement of claim 5 in which the amount of the water soluble sulfite is from about 1.0 part to about 1.5 parts by weight for each 100 parts of latex solids.

7. The improvement of claim 5 in which the water-soluble sulfite is sodium sulfite.

References Cited
UNITED STATES PATENTS 3,215,647   11/1965   Dunn _____ 260—2.5

MURRAY TILLMAN, *Primary Examiner.*

M. FOELAK, *Assistant Examiner.*

U.S. Cl. X.R.

260—852, 39, 41.5, 29.7, 29.4, 15